April 10, 1951  K. A. OSTERBERG  2,548,319
NAVIGATION INSTRUMENT AND COMPUTER
Filed Aug. 26, 1949  4 Sheets-Sheet 1
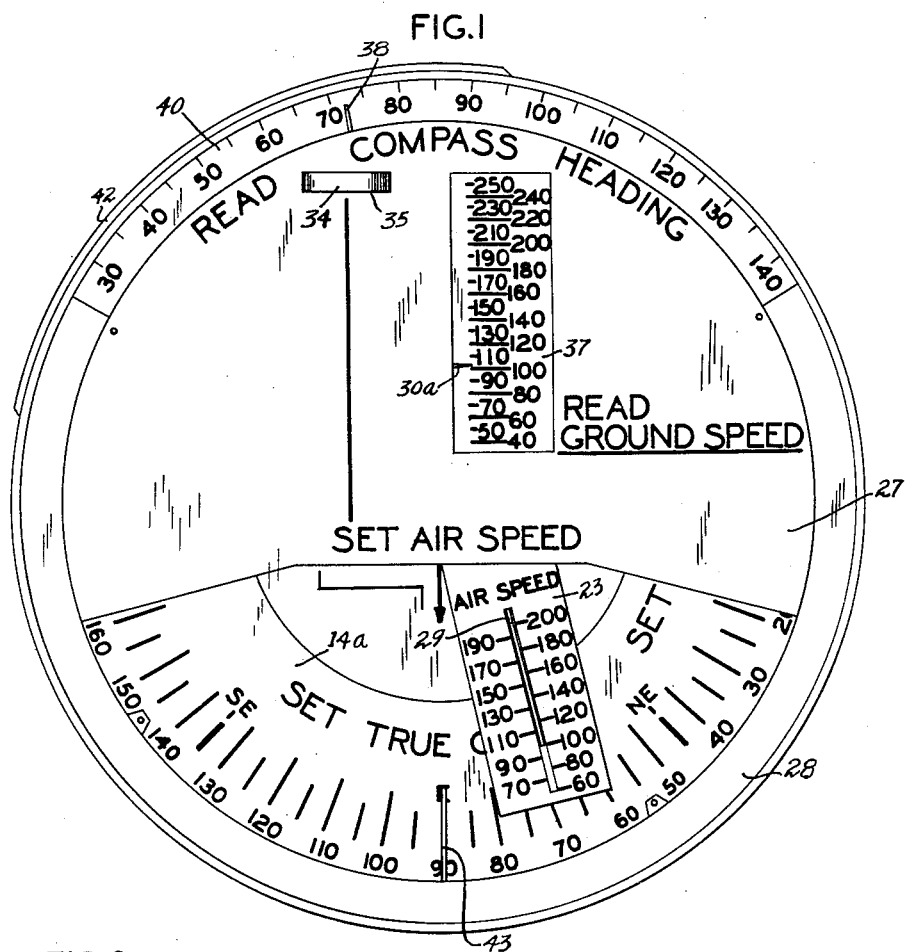
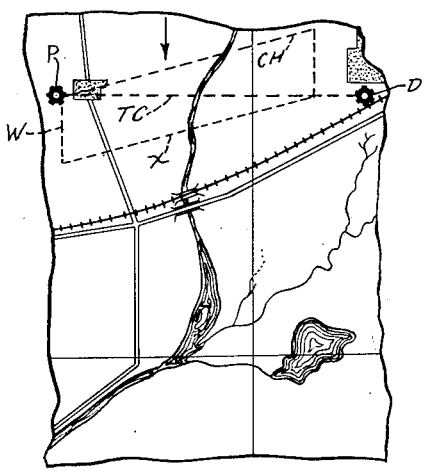
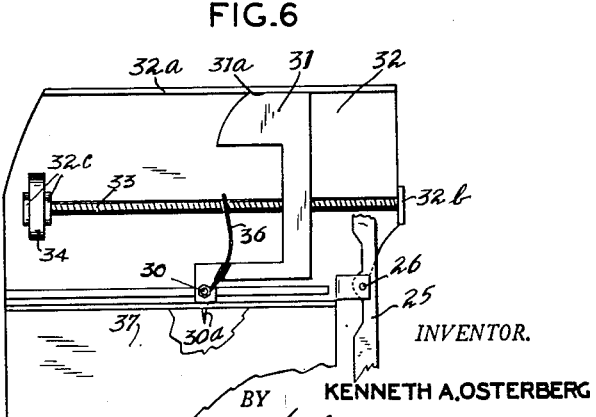
INVENTOR.
KENNETH A. OSTERBERG
BY Williamson & Williamson
ATTORNEYS April 10, 1951 K. A. OSTERBERG 2,548,319
NAVIGATION INSTRUMENT AND COMPUTER
Filed Aug. 26, 1949 4 Sheets-Sheet 2

INVENTOR.
KENNETH A. OSTERBERG
BY
*Williamson & Williamson*
ATTORNEYS

INVENTOR.
BY KENNETH A. OSTERBERG
*Williamson & Williamson*
ATTORNEYS

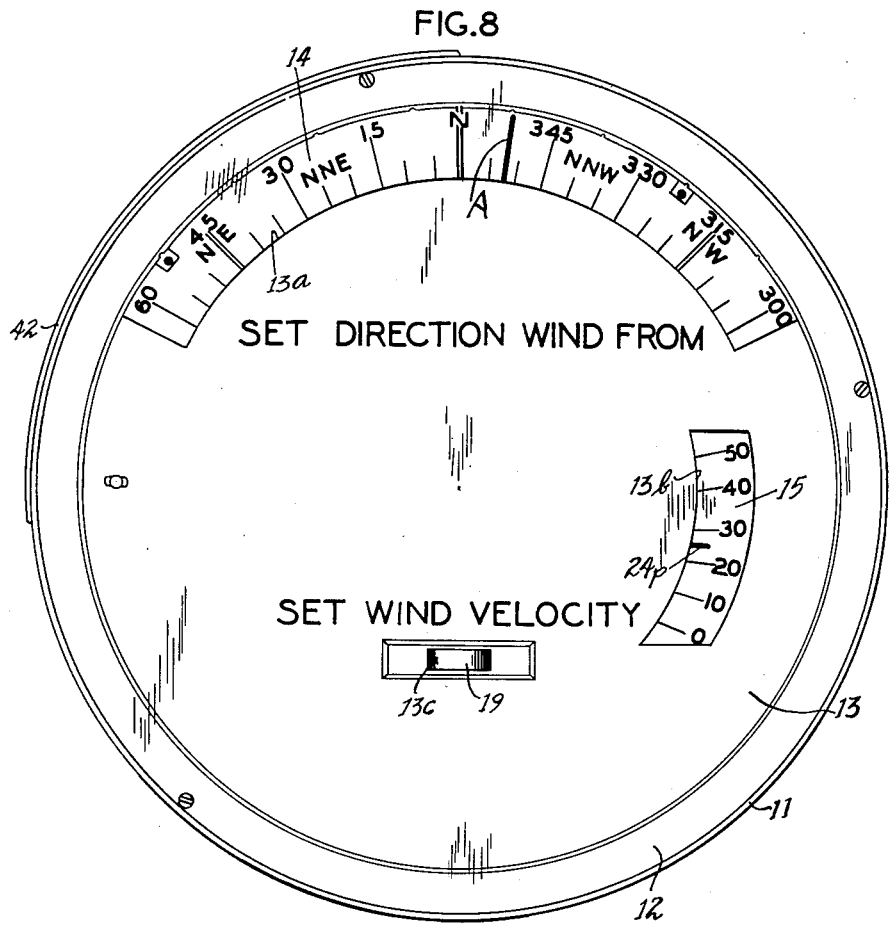
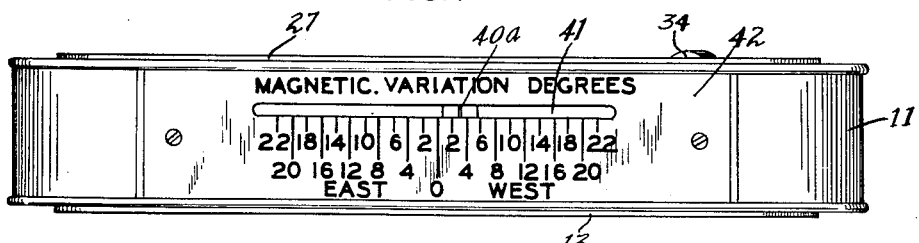

Patented Apr. 10, 1951

2,548,319

UNITED STATES PATENT OFFICE 2,548,319

NAVIGATION INSTRUMENT AND COMPUTER

Kenneth A. Osterberg, Minneapolis, Minn.

Application August 26, 1949, Serial No. 112,613

7 Claims. (Cl. 235—61)

This invention relates to navigation instruments particularly adapted to air travel but applicable to ground and water travel, for computing from a knowledge of the direction and force of the wind, the magnetic variation of the area, the speed of the vehicle and the true course desired, first, the compass heading to obtain a predetermined true course to a destination and secondly, to determine the actual ground speed of the vehicle in flight.

It is an object of my invention to provide in a compact, easily settable instrument, mechanism for obtaining an accurate compass heading for steering to make good a predetermined true course leading to a predetermined destination.

More specifically, it is an object to provide an instrument of the class described where related mechanisms mounted essentially upon two oscillatory disc assemblies, translate and geometrically produce resultant readings on appropriate dials or indicia for compass heading and ground speed after the instrument has been hand set for direction of wind, wind velocity, magnetic variation, true course compass reading and air speed.

A further object is the provision of a compact instrument of the class described capable of being conveniently hand set by a pilot during flight and comprising essentially, an annular frame serving as a mounting for dial indicia and readings as well as a mounting for two independently rotary or oscillatory disc assemblies with interconnecting mechanism for obtaining accurate resultant readings to denote compass heading and ground speed.

These and other objects and advantages of my invention will more fully appear from the following description made in connection with the accompanying drawings wherein like reference characters refer to similar parts throughout the several views and in which:

Fig. 1 is a plan view of the resultant reading face of an instrument embodying my invention;

Fig. 2 is a plan view with the upper or "compass heading" disc detached and showing most of the mechanism of the lower or "wind post" assembly disc in position before setting, some elements including the air speed bar and adjustment for air speed of the upper disc assembly being illustrated and other elements such as the compass heading bar being indicated in dotted lines with portions of the true course dial being broken away;

Fig. 6 is a fragmentary plan view taken from the bottom of the upper or "compass heading" disc showing the means for adjusting the setting of air speed;

Fig. 7 is a side elevation of the assembled instrument showing the segmental scale plate and setting for magnetic variation;

Fig. 8 is a plan view of the bottom face or wind post assembly face of the instrument; and Fig. 9 is a fragment of a conventional air map showing the laying out of a simple flight problem thereon.

Figure 2:
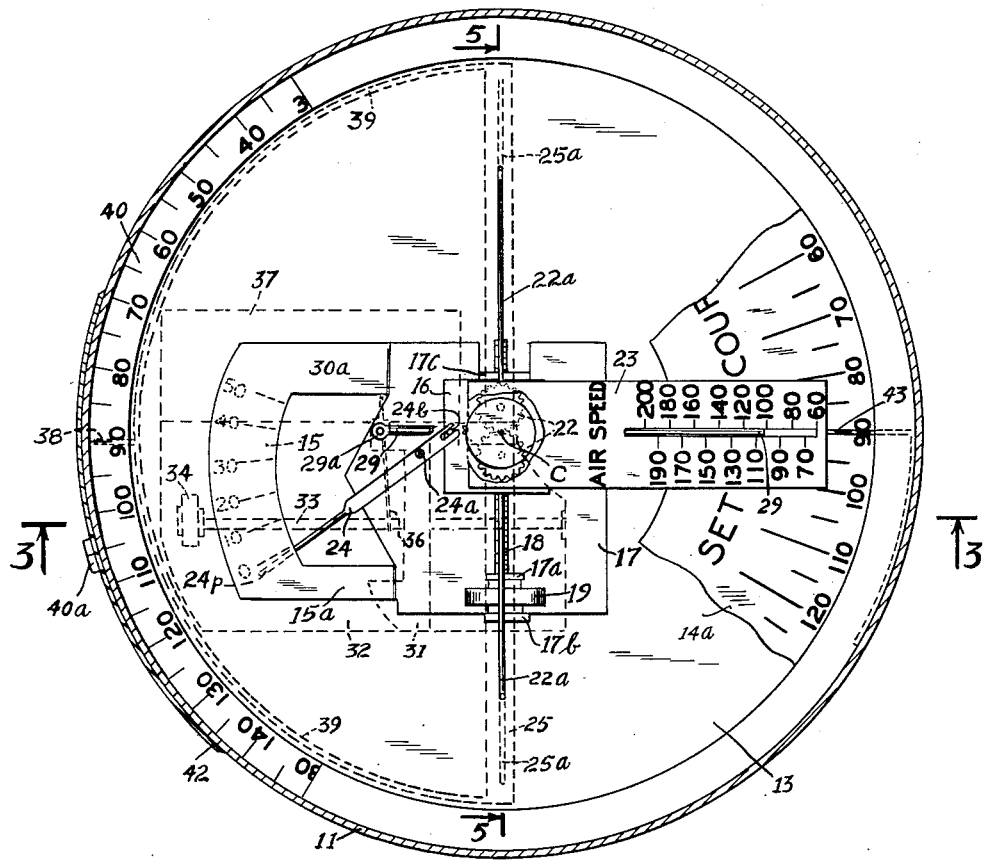

My instrument in its broadest aspects comprises a pair of coaxially mounted, settable disc assemblies and a frame member for pivotally mounting and preferably embracing and enclosing the working mechanism of said two related disc assemblies. The frame member also serves as a medium for supporting several graduated dials to determine independent hand settings of the two disc assemblies as well as to determine with the cooperation of a pointer connected with a compass heading member, the desired true compass heading obtained. One of the said disc assemblies referred to hereafter as a "wind post-disc assembly" carries related mechanism for carrying out mechanically, the geometrical computation and positioning of a "wind line" and "wind point" from a point of take-off for a plane or other vehicle. The common axis of the two disc assemblies corresponds mathematically to the point of take-off in a geometrically calculated navigation problem. The second disc assembly hereinafter referred to as the "air speed bar and true course-disc assembly" carries related mechanism and connector elements for carrying out mechanically, the geometrical calculation and plotting of a usually triangulated figure which includes the true course line and the air speed line connecting the wind point with the true course line, whereby the combinative relationship of said two assemblies with indicator elements and graduated dials, bring about an accurate reading for compass heading and also, resultant or ground speed along the true course during travel.

Referring now to the embodiment of my invention illustrated, an annular rigid frame 11 is provided having as shown, a narrow lower annulus 12, suitably affixed within the peripheral edge of frame 11 and forming a race or annular bearing for a relatively thick lower disc 13 which has mounted thereon, mechanism hereinafter referred to as the "wind post-disc assembly." Disc 13 is preferably constructed of transparent material and is opaquely coated as shown on its inner surface throughout the major portion of its area, leaving however as shown in Fig. 8, a relatively large sector shaped window 13a for exposing therebelow, a compass and degree graduated stationary dial 14 affixed intermediately of the frame to determine wind direction setting. Another section of disc 13 also is uncoated or provided with a transparent, relatively small window 13b disposed concentrically inwardly of the larger window 13a for exposing to view a portion of a wind velocity degree-graduated dial 15 which is affixed by an attachment plate 15a to the inner surface of the disc 13.

To the medial portion of the inner face of disc 13 is mounted a wind post assembly comprising a rectangular block wind post carriage 16 slidably mounted upon a flat base plate 17 and guided and controlled for adjustment by a screw 18 threadedly connected therewith and passing therethrough, said screw extending radially of disc 13 with its longitudinal center line intersecting the axis of the disc which as previously stated, corresponds to the take-off position of the vehicle. The outer portion of screw 18 is journaled in a pair of struck-up lugs 17a and 17b provided by the base plate 17 and a wind velocity turning knob 19 is affixed to the outer portion of said screw and has a portion of its periphery extended through a slot 13c formed in disc 13 to enable the knob and screw to be manipulated exteriorly of the instrument. The inner end of screw 18 is journaled in an up-struck lug 17c also provided by the inner portion of the base plate 17. Carriage block 16 carries an upstanding or inwardly extending wind post or pivot member 20 of cylindrical contour but as shown, being circumferentially grooved to receive and pivotally retain a wind post assembly member 21, as shown of general cylindrical form having a transverse slide bearing 21a formed therein through the inward extremity of the member 21, which is adapted as will be later described, to receive the air speed bar of the second or upper disc assembly. Wind post assembly member 21 is recessed or suitably constructed from a pair of parts to medially receive and journal a pair of similar intermeshed small gears 22 intermeshed at a point coaxial with the wind post 20. A rigid air speed-setting scale plate 23 is affixed at its inner end to the top or inner extremity of assembly member 21 and has its longitudinal central portion slotted and aligned with the slide bearing 21a which also as has been stated, intersects the axis of the wind post 20. A swingable, wind velocity indicator arm 24 is provided by a fulcrum pin 24a to a suitable point on base plate 17 removed a short distance from one side of the wind post carriage block 16 and has its inner end as shown, connected by slot and pin mechanism 24b with the side of carriage 16. The outer end of the indicator arm 24 forms a pointer 24p which cooperates with the accurately calibrated graduations on the wind velocity scale 15 which is exposed to view through the window 13b of the lower or wind post assembly disc.

Referring now to the upper or air-speed and true-course-disc assembly and interconnecting mechanism between such assembly and the wind post disc assembly, I provide a compass heading member as shown, in the form of an elongated rigid bar 25 pivotally mounted on a short pivot pin 26 fixed to the underside of the upper disc 27 and which is axially aligned with the true center C of the entire instrument including the two discs 13 and 27 and the annular frame 11. Compass heading bar 25 is interconnected with the wind post assembly member 21 in such manner as to always produce a predetermined bearing relation between the interconnected members. To this end as shown, the intermeshing-motion-translating gears 22 of the wind post assembly member have each affixed thereto and extending outwardly and radially therefrom, offset rigid translation arms 22a, the outer ends of which as illustrated, are inwardly or upwardly bent to engage respectively, elongated connection slots 25a formed in the outer portions of the compass direction bar 25.

The upper or air speed bar and true course-disc 27 is journaled similarly to the lower disc 13 in a narrow annulus 28 affixed within the upper edge of frame 11 and carries on the inner face thereof, mechanism for supporting, interconnecting and longitudinally adjusting a straight air speed bar 29 illustrated of rod formation which is slidably received in the transverse slide bearing 21a of the wind post assembly member previously described. The inner end of air speed bar 29 is provided with a bearing eye 29a in which is swiveled an inwardly projecting pivot post 30 which may be referred to as an air-speed-bar-true course-connector pivot.

Figure 3:
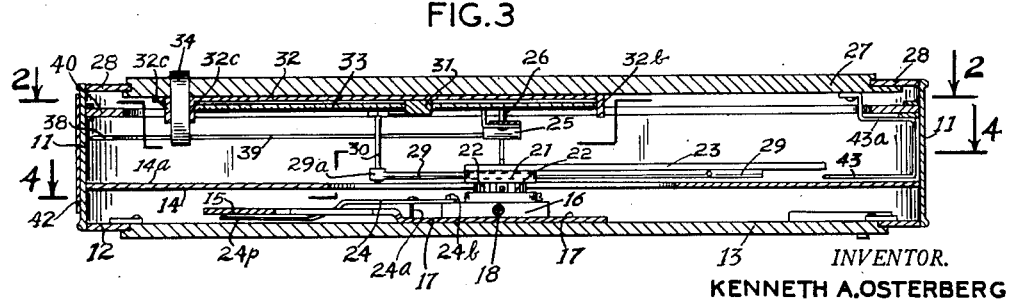
Fig. 3 is a cross section of the full assembled device taken substantially along the line 3—3 of Fig. 2.

Connector pivot 30 is mounted on a small carriage (see Figs. 2, 3 and 6) said carriage as shown, constituting a rigid plate 31 slidably mounted on a flat base plate 32 affixed to the under surface of upper disc 27. The carriage 31 has a straight lateral guiding edge 31a which engages an up-turned guiding flange 32a of the base plate to cause the carriage actuated by a screw 33 to move transversely of disc 27. The connector pivot pin 30 is rigidly fixed to an off-set arm of carriage 31 and necessarily, travels in a line radial to the disc 27 and constituting the true course line of the navigation problem.

Screw 33 is journaled at its inner end as shown, in an up-struck lug 32b formed by one end of the base plate 32 and at its opposite end, is journaled in a pair of closely spaced up-struck lugs 32c formed from the plate 32. The outer end of screw 33 has fixed thereto, a turning knob 34 which is accommodated in a slot 35 (see Fig. 1) formed adjacent the marginal edge of disc 27, a portion of the periphery of the knob extending externally of disc 27 to permit manipulation from the face of the instrument. The screw 33 does not have a positive threaded engagement with the connector pivot carriage 31 although it is loosely accommodated by the intermediate portion of the carriage. It is connected for movement with the carriage by a spring finger clutch element 36 which is affixed as shown in Fig. 6, to the carriage adjacent the pivot pin 30 and which rides the under thread of screw 33 but may slip thereon under certain circumstances.

The outer end of the air speed bar 29, per se, constitutes a movable indicator observable from the upper face of the instrument directly below the slot in the air speed setting scale plate 23 in cooperation with the numbered graduations thereon. A ground speed indicator needle 30a is fixed to the offset pivot pin portion of the carriage 31 and cooperates with a ground speed reading scale plate 37 which may be an integral part of the base plate 32 and which has graduations thereon to indicate the various speeds per hour.

From the foregoing description and the accompanying drawings, it will be seen that various of the described mechanisms mounted on both the upper disc 27 and the lower disc 13, are positioned within the central portions of the instrument. To obtain a compass heading reading (requiring a movable needle or arm) and to avoid interference with such mechanism, I have connected the compass heading bar 25 with a compass heading needle 38 by means of a semicircular sector rod 39. This sector rod, as shown, is disposed concentrically of the instrument adjacent the marginal edge of the upper disc 27, and surrounding many of the parts of the working mechanisms. The compass heading needle 38 cooperates with the compass or degree graduations on a narrow annular dial 40 mounted for limited oscillatory adjustments for magnetic variation within the annular frame 11 a short distance below the upper edge thereof. This adjustable annular dial has affixed thereto an outwardly and radially projecting setting arm 40a which works through a circumferential slot 41 formed in a convenient portion of the annular frame 11. The central marking on the setting arm 41 cooperates with a segmental scale plate 42 which is also affixed to frame 11 and has graduations and appropriate readings to indicate magnetic variations east and west from a zero point.

To set the instrument for true course, an indicator needle 43 is rigidly affixed to the underside of the upper disc 27 through a suitable medium such as the offset and depending arm 43a and cooperates with compass and degree graduations imprinted or otherwise affixed to the top surface of the intermediately disposed, relatively wide annular dial 14, rigidly affixed to the annular frame 11.

*Operation*

With my instrument, the various settings may be quickly and easily made by a pilot during flight to solve a flight problem and ascertain the proper compass reading and the ground speed from a point to a desired destination. The instrument is so simply constructed and coordinated that the requisite settings (wind direction, wind velocity, true course compass reading, air speed and magnetic variation) may be readily determined from indicia on the outer faces of the main discs 13 and 27 and upon the periphery of the frame 42 mounted on main annulus 11 (for magnetic variations).

As shown in Fig. 8, wind direction is easily set by rotating the disc 13 relative to its supporting frame until the radial pointer marking or arrow A is aligned with the proper graduation on the compass and degree-graduated stationary dial 14 affixed to the annular frame 11. From the same side of the instrument, wind velocity is easily set by turning the knob 19 until the pointer 24p is in line with the correct reading on the sector scale 15. The turning of the knob 19 through screw 18 affects the positioning of the wind post carriage 16 radially of the true center C of the instrument (corresponding to take-off position of the vehicle). Thus, when the direction of wind and wind velocity are set as described, the positioning of the wind post carriage 16 and consequently, the wind post 20 connected thereto, is adjusted in accordance with the point of the left hand end of the dotted line x in the problem illustrated geometrically and on the map segment shown in Fig. 9.

Next, the true course may be readily set by the pilot by oscillating the lower disc 27 in the rigid, annular frame 11, the opposite face of the instrument being of course used for said setting (see Fig. 1) until the fixed pointer 43 is aligned with the proper graduation on the degree-graduated dial 14 affixed to the annular frame.

Air speed is then set by manipulating the knob 34 which extends through an aperture in the disc 27, said knob turning screw 33 which in turn, affects the positioning of the air speed rod 29, the outer end of which acts as an indicator in conjunction with the air speed-setting scale plate 23.

Next, a slight setting is made for magnetic variation by shifting the radially projecting setting arm 40a (see Figs. 2 and 7) to a point indicated on the segmental scale plate 42 by the graduations thereof. Such setting shifts the annular dial 40 relative to annular frame 11 to adjust the positioning of the compass or degree graduations thereon.

After the said setting of the instrument, all very quickly accomplished by the pilot or driver while in flight or travel, the compass heading may be directly read from the face of the instrument supplied by disc 27 through the cooperation of the pointer 38 and the annular, graduated dial 40 and at the same time, the ground speed computed may be directly read from the position of the small needle arm 30a with the stationary plate 37 having graduations thereon.

In the course of said settings, a compound setting of the wind post carriage 16 has been effected with adjustment of the air speed bar rod 29 and the relative settings of the two discs 13 and 27 upon the rigid annular frame. The intermeshing motion-translating gears 22 of the wind post assembly through the translation arms 22a in such settings have determined the position of the compass heading bar 25 which rigidly carries the connection rod segment 39 having affixed thereto, the compass heading needle 38.

Figure 4:
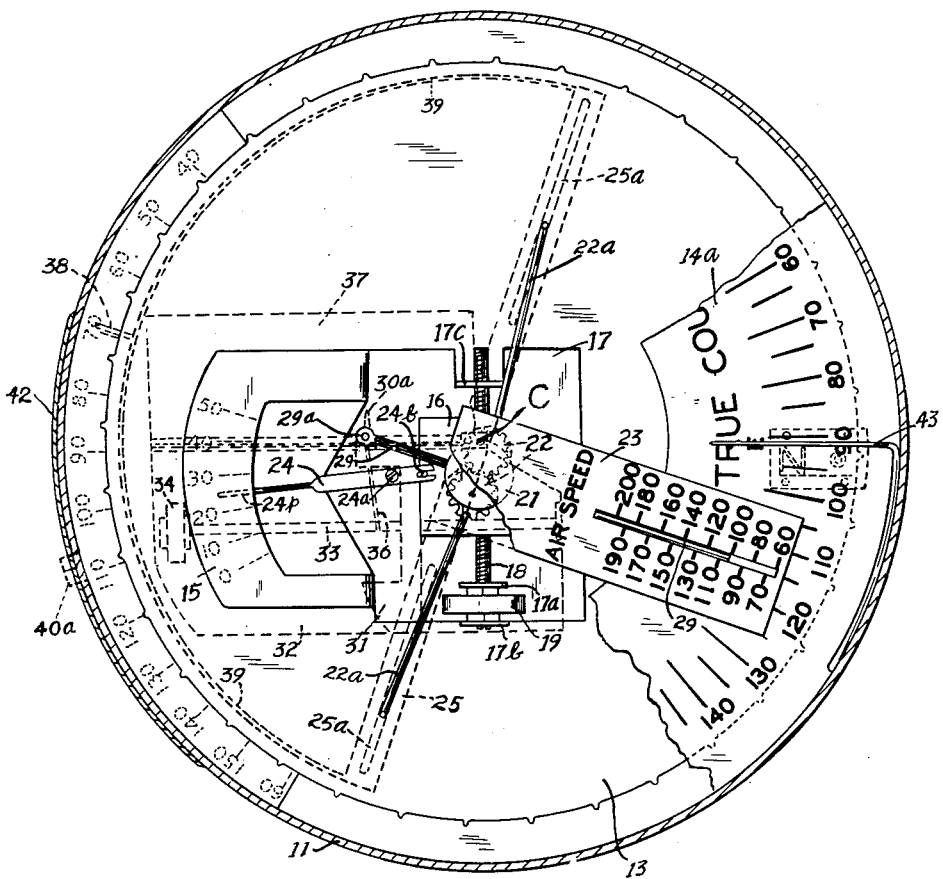
Fig. 4 is a plan view similar to Fig. 2 after hand setting of the various elements for known direction of wind, wind velocity, magnetic variation, true course and air speed.
Figure 5:
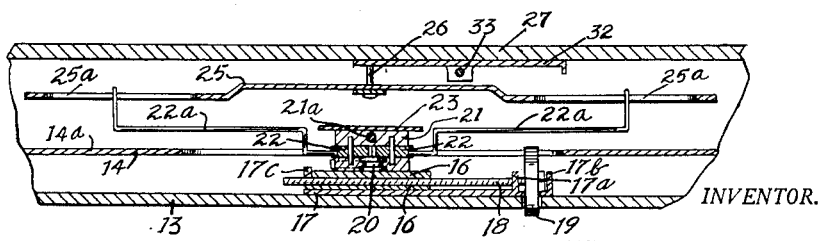
Fig. 5 is a fragmentary cross section taken on the line 5—5 of Fig. 2.

Thus, geometrically, by mechanical inter-related elements, the problem illustrated in Fig. 9 is solved by the resultant positioning of the compass heading needle 38 reading on the degree graduated scale 40 and by the resultant adjusted position of the ground speed reading needle 30a relative to its scale plate 37. In Fig. 4, the resultant positions of the various elements are shown after setting of the instrument for the problem shown in Fig. 9.

From the foregoing description, it will be seen that I have provided a comparatively simple, fool proof instrument for quickly and very easily computing from a knowledge of the direction and force of the wind, the speed of the vehicle, the true course desired and the magnetic variation of the area, the compass heading to determine a predetermined true course to a destination and secondly, to determine the actual ground speed of the vehicle in flight.

My novel structure permits a pilot or driver to very quickly make the desired settings without skilled knowledge or memory of complicated settings and factors. The settings necessary are obvious from reading of simple indicia on the two faces and periphery of the instrument itself.

While my instrument was primarily conceived, scaled and graduated for navigation problems, I wish to make it clear that I contemplate its use suitably graduated and proportioned for the computation of many and various three dimensional mathematical problems where through settings of four or five factors in a problem, one or more resultant computations are desired. My settings for wind direction, wind velocity, true course compass readings and air speed may all be applied to settings in a mathematical problem representing four different components or factors and my computations obtained as described, for compass heading and ground speed, may be utilized to determine resultant answers desired in a mathematical problem.

Therefore, wherein in the appended claims, the terms "wind post," "air speed bar," "true course," "wind post carriage," "compass heading member," etc. are used, they are to be broadly construed as designating equivalent elements cooperating in the general relationship of my mechanism, for computing and solving various mathematical problems.

It will of course, be understood that various changes in the form, details, arrangement and proportions of the parts may be made without departing from the scope of my invention.

What I claim is:

1. An instrument or calculating apparatus for computing or solving mathematical and geometrical problems of three dimensional or more factors having in combination, a frame carrying graduated dials adjacent both faces of the periphery thereof, a post-disc assembly and a related bar and disc assembly, said disc assemblies being co-axially mounted in said frame for rotative setting therein, said first disc assembly comprising a disc and a post-carriage mounted for slidable adjustment radially of said disc and carrying an inwardly projecting post disposed normal of said disc and having a terminal element swivelly connected thereto and provided with a transverse, bar-receiving slide bearing, said second disc assembly comprising a settable disc, a heading member concentrically pivoted upon the inner face of said disc, a bar slidably mounted for longitudinal adjustment in the slide bearing of said terminal element of said post, motion-translating connections between the member or swivelled element carried by said wind post and said heading member for maintaining a predetermined, angular relationship therewith in all circumferential positions and in all longitudinally adjustable positions of said bar, and means connected to the inner face of said second disc for effecting controlled, longitudinal adjustment of said bar and an indicator element connected with said heading member for cooperation with the graduated dial fixed to said frame member to indicate the resultant heading answer.

2. A navigation instrument for determining compass heading having in combination, a frame carrying graduated dials adjacent both faces of the periphery thereof, a wind post disc assembly and a related air speed bar and true course disc assembly, said disc assemblies being co-axially mounted in said frame for rotative setting therein, said first mentioned disc assembly comprising a disc and a wind post carriage mounted for slidable adjustment radially of said disc and carrying an inwardly projecting wind post having a terminal element swivelly connected thereto and provided with a transverse, bar-receiving slide bearing, said second disc assembly comprising a settable disc, a compass heading member concentrically pivoted upon the inner face of said disc, an air speed bar slidably mounted for longitudinal adjustment in the bearing of said terminal element of said wind post, motion-translating connections between the member or swivelled element carried by said wind post and said compass heading member for maintaining a predetermined angular relationship therewith in all compass bearing positions and in all longitudinally adjustable positions of said air speed bar and means connected to the inner face of said second disc for effecting controlled longitudinal adjustment of said air speed bar to obtain a setting corresponding to "air speed" and an indicator element connected with said compass heading member for cooperation with a graduated dial on said frame member to indicate the true resultant compass heading.

3. The structure set forth in claim 2, and a setting element extending radially of said frame for changing settings of a compass heading, graduated dial within said frame, to make correction in setting for magnetic variations, said dial being readable through the resultant positioning of said compass heading element.

4. The structure set forth in claim 2 and a true course-indicator element on the disc of said second mentioned assembly, the terminal element of said wind post and its slide bearing connection with said air speed bar bringing about geometrical relation with the positioning of the wind post on the wind post-disc assembly.

5. The structure set forth in claim 2 and said mechanism for controlling longitudinal adjustment of said air speed bar comprising a carriage mounted on the inner face of said second disc and having a connector pivot movable radially of said second disc, said connector pivot as recited in claim 2, being journaled in a bearing at the inner end of said air speed bar and a screw element turnable from the exterior of said second disc for adjusting said carriage.

6. A navigation instrument for determining compass heading having in combination, an annular frame carrying graduated dials adjacent both faces of the periphery thereof, a wind post-disc assembly and a related air speed bar and true course-disc assembly, said disc assemblies being co-axially mounted in said frame for rotative setting therein, said first mentioned disc assembly comprising a disc and wind post carriage mounted for slidable adjustment radially of said disc and carrying an inwardly projecting wind post, a member swivelly connected with said wind post and provided with a transverse bar-receiving slide bearing, a pair of intermeshed, small gears journaled in said member and intermeshing at the axis of said wind post, said gears each having affixed thereto rigid motion-translating arms, said second disc assembly comprising a rotatively settable disc, a compass heading bar concentrically pivoted upon the inner face of said disc, slide connections between the outer ends of said motion-translating arms and said compass heading bar whereby a predetermined relationship between said bar and the swivelled member of said wind post will be maintained, an air speed bar slidably connected with said slide bearing of the swivelled member of said wind post, mechanism connected to said second disc for controlling longitudinal adjustment of said air speed bar in said bearing, said mechanism including a connector pivot projecting inwardly from said second disc in parallel relation with the axis of said disc and having its terminal portion journaled in a bearing carried by the inner end of said air speed bar and an indicator element fixedly connected with said compass heading bar and disposed adjacent the marginal edge of said second disc for cooperation with a graduated dial on said frame member to indicate the true resultant compass heading.

7. A compass heading and ground speed computing navigation instrument having in combination, a frame, a wind post disc assembly and an air speed bar and true course disc assemblies, said disc assemblies being coaxially mounted in said frame for oscillation and setting therein, said wind post assembly including a wind post carriage mounted for slidable adjustment radially of said assemblies whereby the rotating setting or compass bearing setting of said wind post assembly disc and the slidable adjustment of said wind post carriage obtains a positioning of said wind post corresponding to the wind point on the wind line produced in geometrically computing a navigation problem, said air speed bar and true course disc assembly comprising a settable mounting disc, a compass heading bar concentrically pivoted upon said disc, an air speed bar slidably mounted for longitudinal, slidable adjustment in a member carried by said wind post carriage and having motion-translating connections between said member carried by said wind post carriage and said compass heading bar for maintaining a predetermined angular relationship therewith in all bearings and longitudinally adjustable relations of said air speed bar and means for longitudinally adjusting said air speed bar connection with the inner side of said last mentioned disc to obtain a setting of said air speed bar corresponding to air speed and connections between said compass heading bar for indicating the resultant compass heading.

KENNETH A. OSTERBERG.

REFERENCES CITED

The following references are of record in the file of this patent:

UNITED STATES PATENTS

| Number | Name | Date |
| --- | --- | --- |
| 1,910,093 | Colvin | May 23, 1933 |
| 1,919,126 | Perkins | July 18, 1933 |